Patented July 29, 1947

2,424,937

UNITED STATES PATENT OFFICE 2,424,937

INCENDIARY COMPOSITION

Harry K. Linzell, Long Lake, Ill., assignor to United States Gypsum Company, Chicago, Ill., a corporation of Illinois No Drawing. Application February 22, 1943,
Serial No. 476,800

1 Claim. (Cl. 44—3)

This invention pertains to a new and improved type of a heating mixture capable of developing intense heat. More particularly it refers to those types of reactions broadly classified as Thermit.

In the conventional type of Thermit reaction, as shown below, a certain amount of heat is developed. However, by means of this invention, considerably greater efficiency is obtained, less materials are required to obtain the same amount of heat output or conversely more heat is obtained on a unit basis.

In its essential form this invention is directed to an incendiary mixture comprising preferably certain forms of calcium sulfate and aluminum, present in such quantities which when reacted develop intense heat and of sufficient magnitude to melt or soften such high melting materials as steel, stone, or the like. Though there are a number of adaptations and extensions some of which are described hereinbelow, it is desirable that certain fundamental thermodynamic data be reviewed in order to develop more fully the elements underlying this invention.

In Table I given below, the principal reactions as known are given. Likewise the amount of heat as developed in terms of B. t. u., is given. Of course it is possible that other reactions may occur simultaneously and it is not intended to be limited by the reactions set forth since they are for illustrative and exemplary purposes only.

TABLE II

Rate of reaction

| Compound | Time of Burning | B. t. u.'s | | |
|---|---|---|---|---|
| | | Bomb | 1 lb. | 1 minute |
| | Seconds | | | |
| A | 90 | 2,250 | 1,500 | 1,500 |
| B | 73 | 2,990 | 1,990 | 2,460 |
| C | 56 | 3,830 | 3,475 | 4,100 |
| F | 45 | 4,860 | 4,420 | 6,480 |
| J | 74 | 5,980 | 5,440 | 4,850 |

Compositions of compounds

| | | Al | $Fe_3O_4$ | $CaSO_4$ | Total | Excess Al | Type of Reaction |
|---|---|---|---|---|---|---|---|
| A | Per cent | 19 | 61 | | 100 | | 1 |
| | Lbs. per bomb | .355 | 1.145 | | 1.5 | | |
| B | 75% of "A" | | | | | | 1 |
| | 25% of "C" | | | | | | 2 |
| C | Per cent | 35 | | 65 | 100 | 0 | 2 |
| | Lbs. per bomb | .385 | | .715 | 1.100 | | |
| F | Per cent | 41.5 | | 58.5 | 100 | 31 | 2 |
| | Lbs. per bomb | .456 | | .644 | 1.100 | | 3 |
| J | Per cent | 51.1 | | 48.9 | 100 | 94 | 2 |
| | Lbs. per bomb | .562 | | .538 | 1.100 | | 3 |

NOTE: A contains a firing charge having no important effect on computations.

TABLE I

| No. | Reactions and Thermodynamics | | Heat (in B. t. u.'s) of Reaction | | |
|---|---|---|---|---|---|
| | Reactants | End Products | Liberated per pound of mix | Per pound of aluminum | Pounds required to produce 10,000 |
| 1 | $8 Al + 3 Fe_3O_4$ | $4 Al_2O_3 + 9 Fe$ | 1,500 | 6,300 | 6.66 |
| 2 | $8 Al + 3 CaSO_4$ | $4 Al_2O_3 + 3 CaO + 3 SO_2$ [1] | 3,475 | 10,020 | 2.88 |
| 3 | $2 Al + 1\frac{1}{2} O_2$ | $Al_2O_3$ | 12,950 | 12,950 | .77 |

[1] NOTE: Includes intermediate reactions. $4 Al_2O_3 + 3 CaS + 4\frac{1}{2} O_2$ (from air).

It should be noted that the data and calculations as given in this application are based on commercial usage, and are not corrected for academic conditions that are negligible factors commercially. These may be taken into consideration if desired but are not included in the practical application of the principles underlying this invention as set forth herein.

In selecting materials for use in the incendiary or heating composition, it is desirable that all materials be in a fairly pure state, since a number of side reactions may take place in the presence of impurities. Another important factor controlling the rate of reaction is the degree of fineness of the particles present in the mixture. In general the denser the particles size, the more likely there will be an increase in the rate of reaction. Likewise, there is an acceleration in the rate of reaction when the particles are compacted more densely. All of these factors must be balanced to control the rate of reaction.

It is desirable that natural anhydrite or calcium sulfate ground to the desired degree of fineness be used since it is more dense than other forms of calcium sulfate. By using a denser form of calcium sulfate, like natural anhydrite, a greater quantity of the essential material is brought into more intimate reaction, with a corresponding increase not only in the rate of reaction but also its intensity. Of course, other forms of calcium sulfate may be used to replace part of the natural anhydrite. For instance artificially produced anhydrite known as "soluble anhydrite" may be used.

The firing charge consists of gunpowder and other inflammable aiding materials. The presence of about 10% "soluble anhydrite" in the mixture protects the firing charge by absorbing traces of water which may adversely affect the gunpowder. Soluble anhydrite is a very effective desiccant, and will keep the gunpowder dry.

It is desirable not only to protect the firing charge but also that the total amount of water or organic combustible matter present in the incendiary mixture be maintained at less than 1% and preferably less than one half of one per cent. In the combustion stages these materials give off water in the form of steam vapor. Steam has a tendency to create "surges" or slight explosions in the course of reaction if present in substantial quantity. The surges prevent uniform burning of the incendiary mixture and some times may even "snuff" out the reaction.

The aluminum is in powder form, and preferably should have a particle size sufficiently small to pass thru a one hundred mesh sieve. The calcium sulfate likewise should be finely ground and substantially the same particle size as the aluminum. It is desirable to use calcium sulfate having a grind approximately passing 85% through a 200 mesh sieve. It is possible to control the rate of reaction by varying the size of one of the ingredients, or by having the size of the particles in several groups or ratios within the same ingredient or within all ingredients. Though the examples as to time of reaction given below are purely exemplary to better illustrate the principles underlying this invention it should be understood that there are a number of expedients that can be effectively employed to obtain a predetermined rate of reaction.

As mentioned previously the degree of pressure used in compacting, the amount of moisture or organic material present, the purity of the ingredients, weather and temperature conditions, and other factors exert their effect in the final results. Obviously under these conditions it will be difficult to obtain an exact time of burning. It therefore is desirable that all materials used in formulation of this incendiary mixture be carefully tested and a rigid control set up to insure uniformity of results.

In compacting the raw materials together, it is desirable that first they be thoroughly blended in the proportions desired until a uniform dispersion is obtained. It is desirable but not necessary to add some binding material like castor oil, sulfur, etc. to assist the compacted shape in maintaining its form. A very small amount of water will also act as a binder particularly in the presence of soluble anhydrite. But it is desirable that in event binders are used that these be restricted to very small amounts for otherwise "surging" may be induced in the incendiary mixture when the mixture is fired.

Upon reference to Table II, it will be noted that the conventional Thermit reaction involving aluminum and iron oxide develops approximately 1,500 B. t. u. per one pound of composition. Formula "C" as representative of this invention develops 3,475 B. t. u. per one pound of composition or 1975 B. t. u per pound more than the standard Thermit, which is used in incendiary bombs. Formula F containing an excess of aluminum gives off a total of 4420 B. t. u. or 2920 B. t. u. more than the standard. In view of these facts which are supportable by experimental data, it is apparent that the composition of this invention is extremely effective, novel and possesses unusual characteristics.

Upon reference to Table II, it will be noted that the rate of reaction differs with the mixture, though in each case there is a corresponding increase in the amount of B. t. u.'s liberated not only per bomb charge but also per pound of the mix. For instance compound "C" will give 4100 B. t. u.'s per minute whereas compound "J" gives 4850 B. t. u.'s per minute or 1630 B. t. u.'s less than compound "F." Though "J" gives off more total heat, the rate of reaction is considerably slower than that of "F." Under some conditions this may not be important, but in some cases, it is extremely desirable that a high output of heat be initially liberated to reach quickly the melting point of the material heated.

In Table I the reactions as given are thermodynamically balanced. It should be noted that reaction 3 gives off additional heat when aluminum is burned in presence of air. For this reason Formula F in Table II containing 31% excess aluminum, is very effective. In Formula J in which 94% excess is used, the B. t. u.'s per pound of mix have been further increased, but this excess has slowed down the reaction so that the B. t. u.'s per minute have been reduced from 6480 in Formula F to 4850 in Formula J.

Sulfur dioxide is given off as a secondary reaction product involving the ignition of calcium sulfide in presence of the air. These fumes are very irritating to the mucous membrane lining of the nose and throat of a human being and thus add to the effect, in the event the mixture is used for incendiary bomb purposes.

This invention should have many industrial applications, where rapid and intense local heat is wanted for any purpose, without the presence of molten metal such as that produced in the Thermit reaction. Examples are in the butt welding of steel pipes, rails, etc. The reaction may also be used for melting high melting point metals or refractory materials, where the latter do not flux with the slags produced in the aluminium-calcium sulphate reaction.

Examples are silica, aluminum, chromium oxide, iron, platinum, etc. may be melted in this manner.

The possibility exists of using this concentrated source of heat, for promoting chemical reactions between highly refractory materials, or for producing slags or glasses by combining highly refractory oxides, thus producing super refractory, and highly abrasive compounds. Another possibility is the refining of refractory metals which melt above commercially feasible temperature ranges attainable by other methods. It therefore is intended not to be limited by the brief description given hereinabove, but to cover broadly all extensions, adaptations, variations and alternatives that broadly come within the principles underlying this invention as defined by the appended claim.

I claim:

A heating mixture containing in addition to the stoichiometrical quantities of calcium sulfate and aluminum capable of reacting with each other, an additional quantity of not more than 95 percent of aluminum in excess of that required for reaction with the calcium sulfate, whereby the said excess in presence of the intense heat generated by the reaction burns in presence of the atmospheric oxygen to increase the further amount of heat generated.

HARRY K. LINZELL.

REFERENCES CITED

The following references are of record in the file of this patent:

UNITED STATES PATENTS

| Number | Name | Date |
| --- | --- | --- |
| 623,239 | Deissler | Apr. 18, 1899 |
| 1,395,769 | Rankin | Nov. 1, 1921 |
| 1,669,341 | Low | May 8, 1928 |
| 2,232,099 | Jahn | Feb. 18, 1941 |

FOREIGN PATENTS

| Number | Country | Date |
| --- | --- | --- |
| 149,662 | Great Britain | Nov. 8, 1921 |

OTHER REFERENCES

Mellor, "Comprehensive Treatise on Inorganic and Theoretical Chemistry," vol. V (1924), pages 218 and 219.